UNITED STATES PATENT OFFICE.

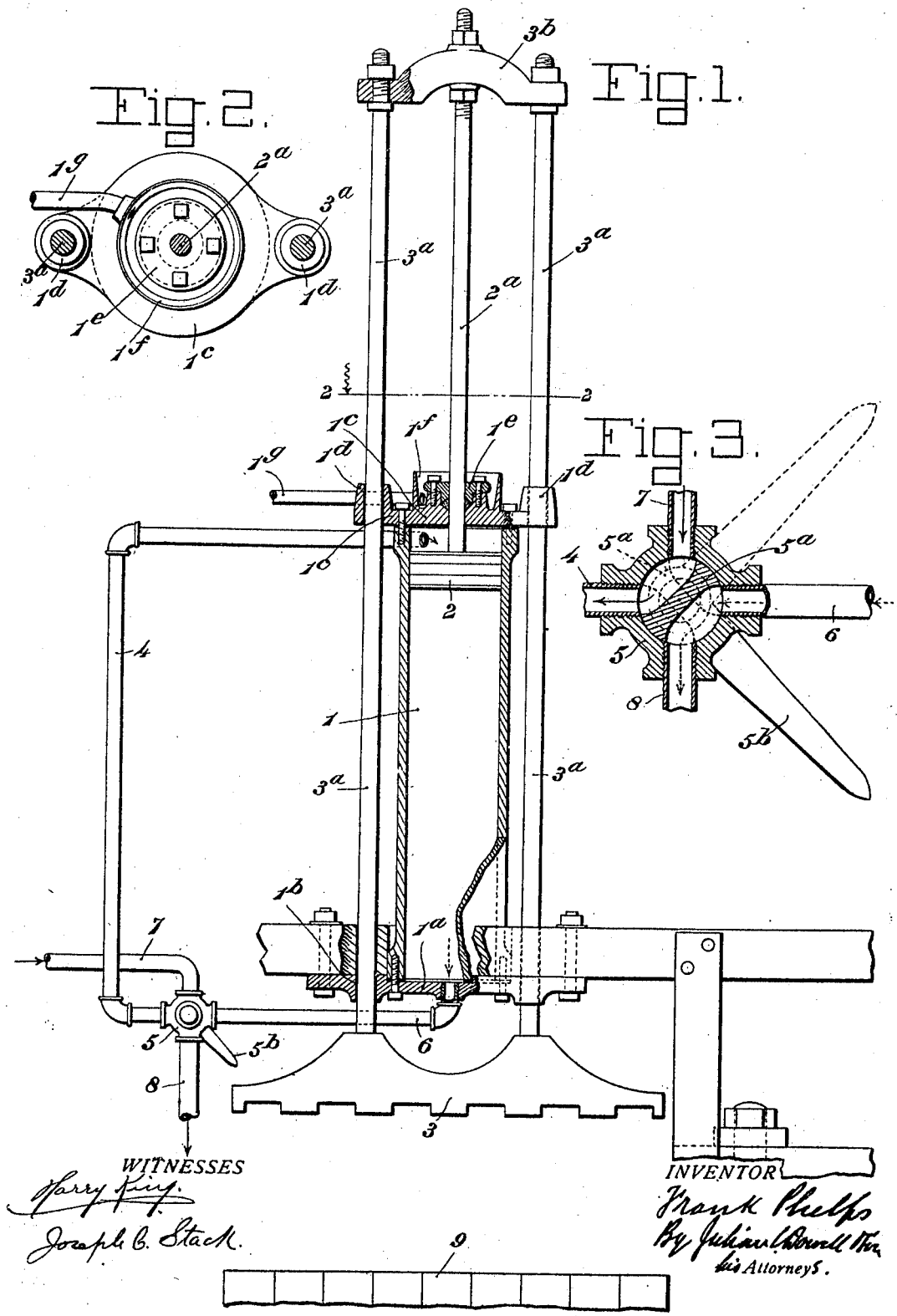

FRANK PHELPS, OF LITTLE ROCK, ARKANSAS.

STEAM-TRAMPER.

945,413.　　　　　Specification of Letters Patent.　　Patented Jan. 4, 1910.

Application filed June 7, 1909. Serial No. 500,724.

*To all whom it may concern:*

Be it known that I, FRANK PHELPS, a citizen of the United States, residing at Little Rock, in the county of Pulaski and State of Arkansas, have invented certain new and useful Improvements in Steam-Trampers; and I do hereby declare the following to be a full, clear, and exact description of the invention, such as will enable others skilled in the art to which it appertains to make and use the same.

This invention is an improvement in machines for baling or compressing cotton and the like, and has particular reference to that class of presses in which the packing-head or tramper is operated by fluid pressure; and the object of the invention is to absolutely prevent leakage of water from the packer-head operating cylinder into the press, which in machines as ordinarily constructed is a source of great annoyance and of considerable loss. Heretofore in such presses the cylinder has been located above the packing-box and a packer-head or tramper has been directly connected to the piston-rod which extends upwardly from the head into the overlying cylinder; and more or less water of condensation escapes through the stuffing-box around the piston-rod and dropping onto the packer-head gets into the baled cotton, and the dampened cotton in the bale will mold and rot, which causes a loss and waste of cotton amounting in the aggregate to a large sum. The present invention prevents any loss or damage of this kind, in a very simple and efficient manner, by the novel arrangement and construction of parts, as hereinafter described; and the invention is readily applicable to the ordinary steam or hydraulic presses at small expense.

In the accompanying drawings I have illustrated one practical form of apparatus embodying the invention, although when understood various modifications in the construction and arrangement of parts thereof may be suggested by a skilled mechanic; and therefore I do not consider the invention restricted to the specific embodiment thereof illustrated in the drawings; and I have set forth in the claims the essential features and combinations of parts for which protection is desired.

In said drawings: Figure 1 is a side elevation, partly in section of part of a baling mechanism, or cotton press, showing the means for operating the packer-head or tramper; and for preventing leakage of water into the baling chamber. Fig. 2 is a detail sectional view on line 2—2, Fig. 1, looking downward. Fig. 3 is an enlarged detail sectional view of a four-way valve which may be used in connection with the apparatus.

1 represents a cylinder which is preferably located above the packing-box or baling-chamber 9, which latter may be of any suitable construction and in which the material is adapted to be compressed by a packer-head or tramper 3, which is operated from the piston 2 in the cylinder, as hereinafter explained.

The cylinder is closed at its ends by heads $1^a$ and $1^c$. The bottom head $1^a$ projects beyond the circumference of the cylinder and is rigidly bolted to the upper timbers or frame of the press, as indicated in the drawings, and is provided with guide-eyes $1^b$ for the passage of vertical rods $3^a$, arranged parallel with and exterior to the cylinder; said rods being also guided in eyes $1^d$ on the upper head $1^c$ of the cylinder, as shown. The rods $3^a$ are connected at their upper ends to a yoke $3^b$, which is centrally connected to the upper end of the piston-rod $2^a$ attached to the piston 2, within the cylinder 1; said rod extending through the upper head $1^c$, the escape of steam around the rod $2^a$ being prevented by a stuffing-box $1^e$, of usual construction, attached to head $1^c$. Surrounding this stuffing-box $1^e$, and preferably formed integral with head $1^c$, is an upstanding annular flange $1^f$ which may extend somewhat above the gland of the stuffing-box and forms a channel or receptacle around the rod, in which any water that may leak through the stuffing-box $1^e$, or which may condense upon the rod $2^a$, is trapped; and such water may be drained from this trap through a pipe $1^g$, as indicated in the drawings, and carried to any suitable point of discharge.

Heretofore the stuffing-box has been located at the lower end of the cylinder so that the piston-rod could be directly connected to the packer-head, and therefore any water leaking past such stuffing-box or steam condensing on the rod would naturally drip onto the packer-head and into the cotton or material being packed, and cause more or less damage thereto as above stated; but by the construction shown and described it is obvious that if any water leaks past the stuffing-box it will be trapped by the flange 1ᶠ and carried off through the drain pipe 1ᵍ.

The piston 2 may be operated in one or both directions by fluid pressure. As shown steam or other suitable operative fluid may be admitted into or exhausted from the upper end of cylinder 1 through a pipe 4 connected at its lower end to one port of a four-way valve casing 5; and the steam or other suitable operative fluid may be admitted into or exhausted from the lower end of the cylinder through a pipe 6 which also connects with the valve casing 5 at the side opposite pipe 4. Steam or operating fluid may be supplied to this valve casing 5 through a pipe 7, and can be discharged therefrom through a pipe 8, connected to the valve casing at a point diametrically opposite pipe 7.

The valve 5ᵃ may be operated by a lever 5ᵇ, and when turned to the position shown in dotted lines Fig. 3, steam will be admitted from pipe 7 through one chamber of valve 5ᵃ and pipe 6 into the lower end of the cylinder, and the piston 2 will then be raised as indicated in Fig. 1; and at the same time any steam above the piston will be exhausted through pipe 4 and through the other chamber of the valve 5ᵃ to pipe 8. If the valve 5ᵃ is shifted to the position indicated in full lines in Fig. 3 the fluid can then escape from the cylinder through pipe 6 and valve 5ᵃ to pipe 8, to any suitable point of discharge; and at the same time steam can be admitted from pipe 7 through valve 5ᵃ and pipe 4 into the cylinder above the piston 2, so as to lower the latter and thereby forcibly move the packer-head 3 into the packing-chamber 9 and press the material therein.

The valve 5ᵃ may be shifted by hand or mechanically as preferred. In some cases the piston could be operated in one direction by fluid pressure, so as to forcibly lower the packer-head, and the parts be then returned to raised position by counterweights or other suitable means; in which case pipe 6 could be used as a drain pipe to carry off any water of condensation in the cylinder, and a three-way cock may be used.

Having described my invention what I claim as new and desire to secure by Letters Patent thereon is:

1. In combination, a baling-chamber, a packer-head, a cylinder, a piston therein, a piston-rod connected with the piston and extending through the cylinder-head, means for trapping and removing any water leaking from the cylinder around the piston-rod, and connections between the piston-rod and the packer-head.

2. In a cotton press the combination of a baling-chamber, a packer-head therefor, a cylinder above the chamber, a piston in the cylinder, a piston-rod connected with the piston and extending through the upper cylinder-head, means on the end of the cylinder for trapping and removing any leakage or water of condensation around the piston-rod, and connections between the piston-rod and the packer-head.

3. In combination, a baling-chamber, a cylinder above the chamber, a head closing the upper end of said cylinder provided with a stuffing-box and a chamber around said box to catch any water leaking from the cylinder, a piston in said cylinder, a piston-rod extending through said stuffing-box, a packer-head below said cylinder, means connecting said piston-rod with the packer-head, and means for admitting actuating fluid to and from the cylinder.

4. In a cotton-press, the combination of a baling-chamber, a vertically disposed cylinder above the chamber, a head closing the upper end of said cylinder and provided with a stuffing-box and an annular chamber around said box to catch any water leaking through the box; a drain pipe connected with said chamber, a piston in said cylinder, a piston-rod extending vertically through said stuffing-box, a packer-head below said cylinder, means connecting said piston-rod with the packer-head, and means for directing actuating fluid to and from the cylinder.

5. In combination, a baling-chamber, a packer-head therefor, a vertically disposed cylinder above the chamber having rod guides on its heads; the head closing the upper end of said cylinder being provided with a stuffing-box and a water trapping chamber around said box to catch any water escaping therethrough; with a piston in said cylinder, a piston-rod extending through said stuffing-box, a yoke connected to the upper end of said piston-rod, tie-rods connecting said yoke with the packer-head and passing through said rod-guides, and means for admitting actuating fluid to the cylinder.

6. In combination, a baling-chamber, a packer-head therefor, a vertically disposed steam-cylinder above the chamber, a head closing the upper end of said cylinder provided with a stuffing-box and an annular flange around said box to catch any water escaping therethrough, a drain pipe connected with said flange; a piston in said cylinder, a piston-rod extending through said stuffing-box, a yoke connected to the upper end of said piston-rod, tie-rods connecting said yoke with the packer-head, and a four-way valve for controlling the inlet and outlet of fluid to and from the cylinder at opposite sides of the piston.

7. In combination, a baling chamber, a cylinder, a piston therein, a piston rod connected with the piston and extending through the upper head of the cylinder, a packer head below the cylinder, and means connecting the piston-rod and packer head whereby the former reciprocates the latter.

In testimony whereof I affix my signature, in presence of two witnesses.

FRANK PHELPS.

Witnesses:
  H. A. BABBITT,
  J. J. ABLES.